United States Patent [19]
Aoki et al.

[11] Patent Number: 5,446,391
[45] Date of Patent: Aug. 29, 1995

[54] DIELECTRIC DETECTING DEVICE

[75] Inventors: Kouji Aoki, Nagoya; Masanori Sugiyama, Nishio; Koichi Sugiyama, Nagoya, all of Japan

[73] Assignee: Aisin Seiki Kabushiki Kaisha, Aichi, Japan

[21] Appl. No.: 50,811

[22] Filed: Apr. 21, 1993

[30] Foreign Application Priority Data

Apr. 23, 1992 [JP] Japan .................................. 4-103320

[51] Int. Cl.$^6$ ............................................. G01R 27/26
[52] U.S. Cl. ...................................... 324/661; 340/562
[58] Field of Search ............... 324/661, 663, 672, 679; 340/562, 540

[56] References Cited

U.S. PATENT DOCUMENTS

| | | | |
|---|---|---|---|
| 4,370,611 | 1/1983 | Gregory et al. | 324/663 |
| 4,433,286 | 2/1984 | Capots et al. | 324/663 |
| 4,796,013 | 1/1989 | Yasuda et al. | |

FOREIGN PATENT DOCUMENTS

| | | | |
|---|---|---|---|
| 3635644 | 8/1990 | Germany. | |
| 3233391 | 10/1991 | Japan. | |
| 1543331 | 2/1990 | U.S.S.R. | 324/663 |

OTHER PUBLICATIONS

Patent Abstracts of Japan P-1298, Jan. 14, 1992, vol. 15, No. 15 (Abstract for JP 3-233391).

*Primary Examiner*—Maura K. Regan
*Attorney, Agent, or Firm*—Sughrue, Mion, Zinn, Macpeak & Seas

[57] ABSTRACT

A dielectric detecting device includes an earth electrode and a sensor electrode opposed to the earth electrode which constitute a capacitor whose capacitance is varied with an existence of a dielectric object therebetween. A detecting device is provided for detecting a change in the capacitance of the capacitor and a capacitance of a circuit in the dielectric detecting device. The detecting device includes an input signal processing device disposed between an output side of the detecting device and an input side of the sensor electrode, a switching device disposed between the input signal processing device and the sensor electrode, and a judging device for judging whether the dielectric object exists or not on the basis of an output of the detecting device and judging whether an error has occurred at one or more of the earth electrode, the sensor electrode, the detecting device and input signal processing device on the basis of capacitances when the switching device is in its on and off conditions.

8 Claims, 7 Drawing Sheets

DIELECTRIC DETECTING DEVICE

BACKGROUND OF THE INVENTION

The present invention is directed to a dielectric detecting device and in particular to a dielectric detecting device which is used for checking whether an occupant exists or not in a vehicle by regarding the occupant as a dielectric.

In general, a dielectric detecting device is in association with a device such as an automatic door locking device. In the light of the fact if an error or trouble occurs in the dielectric detecting device the associate device may be brought into incorrect or abnormal operation, a fail-safe device is added or combined to the dielectric detecting device.

However, such addition or combination will bring a complex arrangement in the arrangement in the neighborhood of the dielectric detecting device.

SUMMARY OF THE INVENTION

In it, therefore, a principal object of the present invention to provide a dielectric detecting device which is simple in construction.

It is another object of the present invention to provide a dielectric detecting device which is used for detecting an existence of an occupant.

In order to attain the foregoing objects, the present invention provides a dielectric detecting device is comprised of an earth electrode, a sensor electrode opposed to the earth electrode for constituting a capacitor whose capacitance is varied with an existence of a dielectric object therebetween, a detecting device for detecting a change in the capacitance of the capacitor and a capacitance of a circuit in the dielectric detecting device, an input signal processing device disposed between an output side of the detecting device and an input side of the sensor electrode, a switching device disposed between the input signal processing device and the sensor electrode, and a judging device for judging whether the dielectric object exists or not on the basis of an output of the detecting device and judging whether an error at one or more of the earth electrodes occurs, the sensor electrode, the detecting device and input signal processing device on the basis of capacitances when the switching device is in its on and off conditions.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which.

DESCRIPTION OF A PREFERRED EMBODIMENT

A preferred embodiment of the present invention will be described hereinunder in detail with reference to the accompanying drawings.

Figure 1:
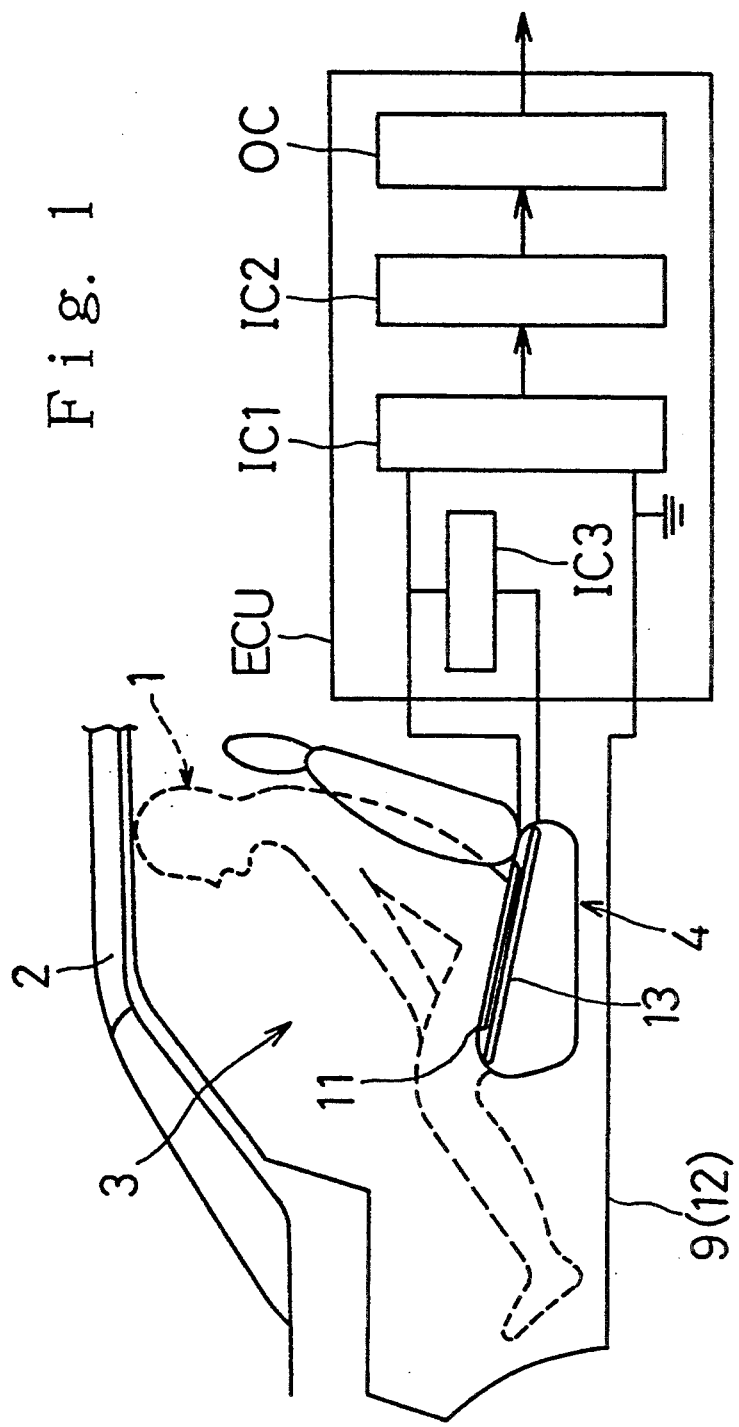
FIG. 1 is a conceptual view of a dielectric detecting device according to the present invention which is used in a vehicle.
Figure 2:
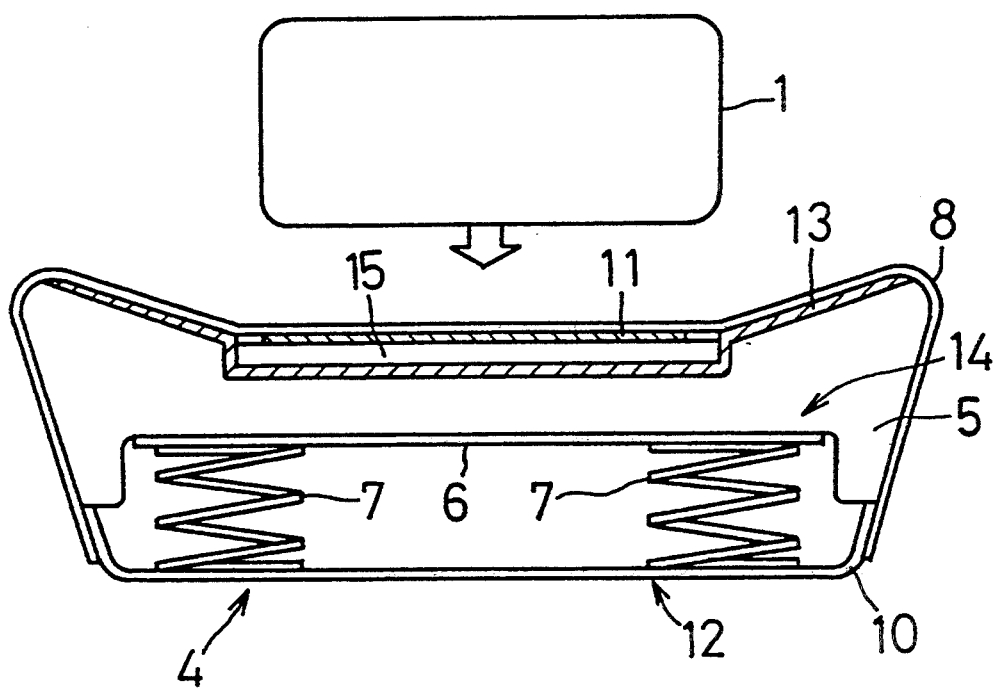
FIG. 2 is a cross-sectional view of a seat in which a dielectric detecting device according to the present invention is mounted.
Figure 3:
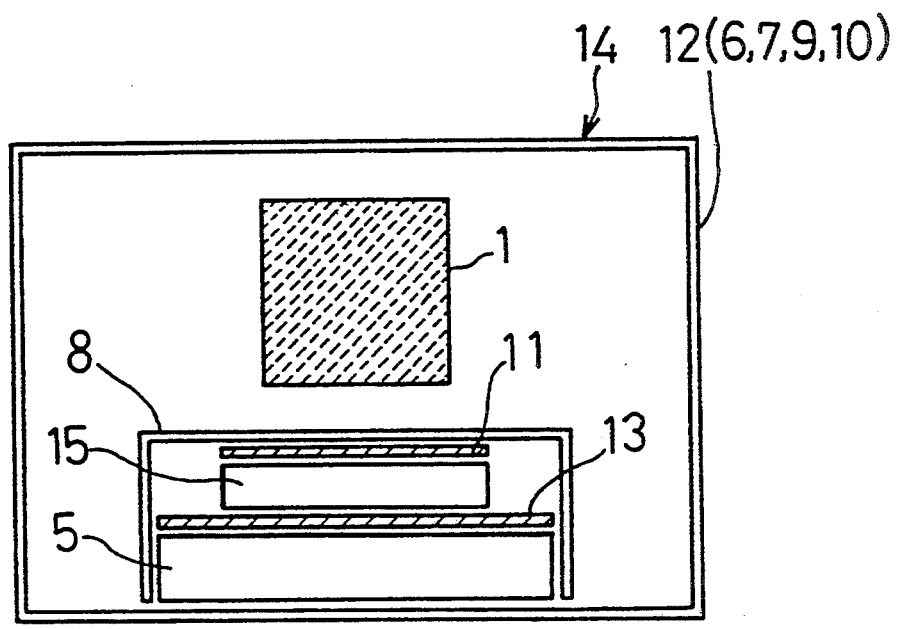
FIG. 3 is a simplified view of a device shown in FIG. 2.
Figure 4:
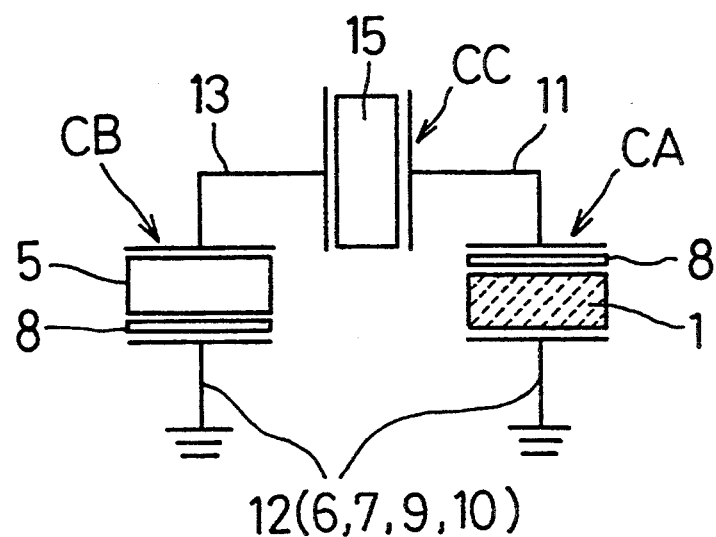
FIG. 4 is an electric circuit equivalent to the disclosure in FIG. 3.

Referring to FIGS. 1 through 4, a vehicle 2 includes a vehicle body 9 having therein an inner space 3. Within the inner space 3, a seat 4 is provided on which an occupant 1 sits. As best seen in FIGS. 2 and 3, the seat 4 includes a main cushion 5 which constitutes a sitting surface, an S-shaped spring 6 supported by a plurality of coil springs 7, and a seat pan 10 which is regarded as a stationary portion of the vehicle body 9. Within the seat 4, a sensor 14 is provided which has a sensor electrode 11, an earth electrode 12 and an intermediate electrode 13. The sensor electrode 11, which is in the form of a conductive cloth, is interposed between the outer cover 8 and the main cushion 5. The intermediate electrode 13, which is also in the form of a conductive cloth, has a central concave portion which is opposed to the sensor electrode 11 via an urethan member 15 and a peripheral portion which is interposed between the main cushion 5 and the outer cover 8. The earth electrode 12 is constituted by the S-shaped spring 6, the coil springs 7, the seat pan 10, and the vehicle body 9. The seat 4 including the resultant sensor 14 can be represented as a simple mechanical structure shown in FIG. 3, and also as an equivalent electric circuit shown in FIG. 4. As can be seen from FIG. 4, three independent capacitors CA, CB, and CC are constituted. The capacitor CA is constituted by the opposing sensor electrode 11 and the earth electrode 12. The capacitance of the capacitor CA is set to depend on the occupant 1 in addition to the outer cover 8, both of which are in the electric field formed between the sensor electrode 11 and the earth electrode 12. The capacitor CB is constituted by the opposing intermediate electrode 13 and the earth electrode 12. The capacitance of the capacitor CB is set to depend on the main cushion 5 in addition to the outer cover 8, both of which are in the electric field formed between the intermediate electrode 13 and the earth electrode 12. The capacitor CC is constituted by the sensor electrode 11 and the intermediate electrode 13. The capacitance of the capacitor CC is set to depend on the urethan member 15 which is in the electric field formed between the sensor electrode 11 and the intermediate electrode 13.

Figure 5:
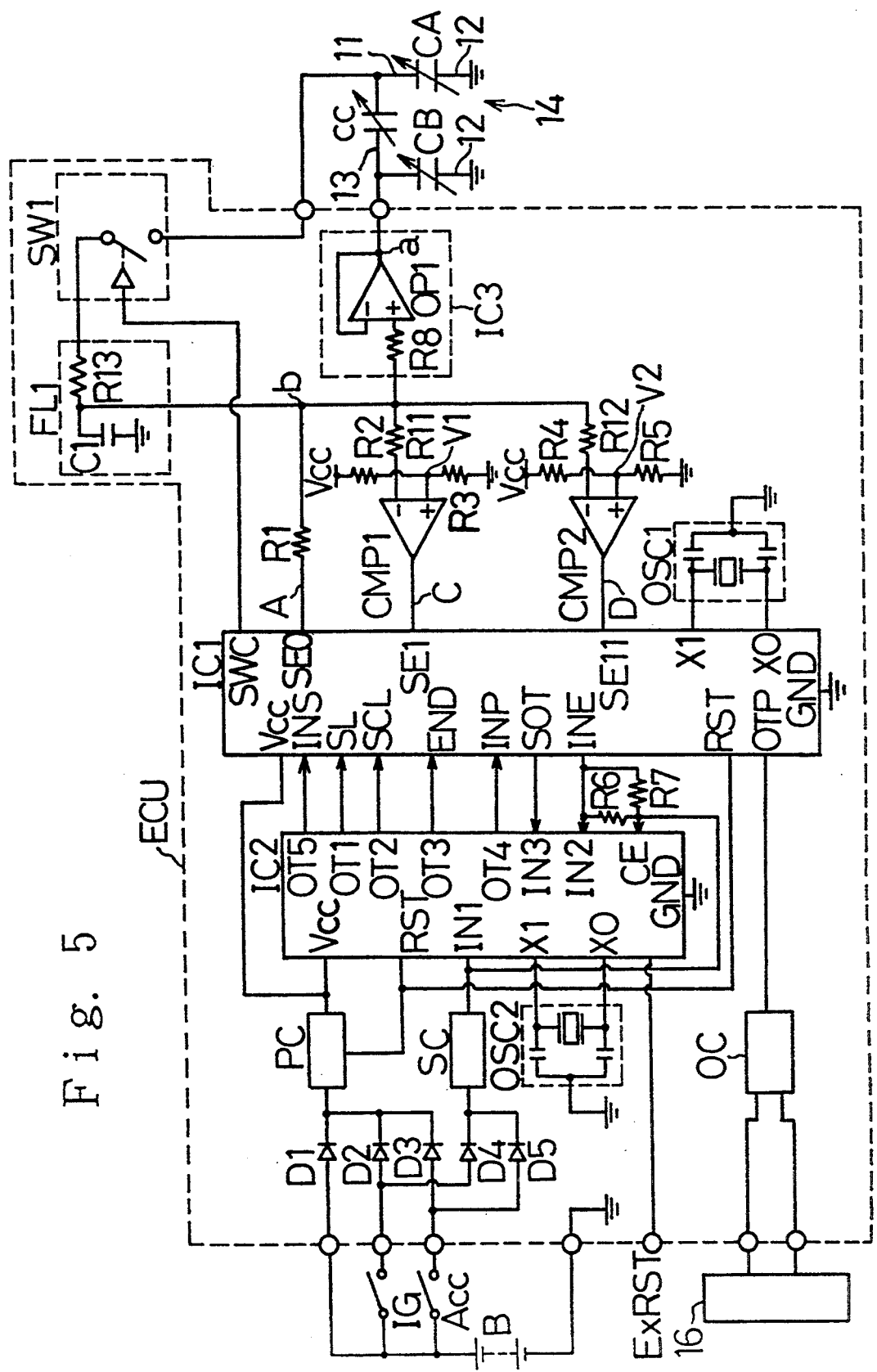
FIG. 5 is an electric circuit of a dielectric detecting device according to the present invention.

An occupant detecting device ECU will be detailed hereinbelow which is provided with the foregoing sensor 14. As illustrated in FIG. 5, a detecting circuit IC1, which is in the form of a Gate Array, is set to detect a variation of the capacitance of the capacitor CA and to control a judging circuit IC2 which is also in the form of a Gate Array. The judging circuit IC2 which has a micro-processor checks an existence of the occupant 1 on the basis of an output from the detecting circuit IC1.

An equalizing circuit IC3 having an operational amplifier OP1 constitutes a voltage follower and is set to equalize the sensor electrode 11 and the intermediate electrode 13 in voltage potential in order to cancel the capacitance variations of the capacitors CB and CC.

The sensor electrode 11 of the sensor 14 is connected to an output port SEO of the detecting circuit IC1 via a resistor R1, an input signal processor FL1 (i.e. a low-pass filter), and a switch SW1 in the form of a relay or other element. The input signal processor FL1, which has therein a capacitor Cl and a resistor R13, serves for eliminating noise from the signal sent from the sensor electrode 11. The switch SW1, which is under the control of a signal from an output port SWC of the detecting circuit IC1, is set to establish or interrupt the electric connection between the input signal processor FL1 and the sensor electrode 11. The intermediate electrode 13 of the sensor 14 is connected to an output terminal of the operational amplifier OP1 whose not-invert input terminal is connected via a resistor 8 to a node "b" at which the sensor electrode 11 and the resistor R1 are connected. The node "b" is also connected via a resistor R11 and a resistor R12 to an invert input terminal of a first comparator CMP1 and an invert input terminal of a second comparator CMP2, respectively. In addition, a voltage $V_{cc}$ is divided by the resistors R2 and R3 in order to establish or define a first threshold level VTH1, which is set to be fed to a non-invert input terminal of the first comparator CMP1. Similarly, the voltage $V_{cc}$ is divided by the resistors R4 and R5 in order to establish or define a second threshold level VTH2, which is set to be fed to a noninvert input terminal of the second voltage comparator CMP2. It is to be noted that the first threshold level VTH1 is set to be less than the second threshold level VTH2, and the first comparator CMP1 and the second comparator CMP2 serve for the detection of the occupant and the breakage of the insulation. An output terminal of the first comparator CMP1 is connected to an input port SE1 of the detecting circuit IC1, and an output terminal of the second comparator CMP2 is connected to an input port SEII of the detecting circuit IC1.

The judging circuit IC2 has a built-in memory EP1 which is in the form of a ROM, a RAM or other element. Output ports OT1, OT2, OT3, OT4, and OT5 of the memory EP1 are connected to input ports SL, SCL, END, INP and INS of the detecting circuit IC1, respectively. An output port INE of the detecting circuit IC1 is connected to an input port CE of the judging circuit IC2 via resistors R6 and R7 connected in parallel as well as to an input port IN2 of the judging circuit IC2. Furthermore, an output port SOT of the detecting circuit IC1 is connected to an input port IN3 of the judging circuit IC2. An enabling signal is outputted periodically from the output port INE of the detecting circuit IC1 to the judging circuit IC2. When the enabling signal is sent to the judging circuit IC2, a serial signal representing the amount of capacitance detected by detecting circuit IC1 is supplied from the output port SOT of the detecting circuit IC1 to the input port IN3 of the judging circuit IC2. After the judging circuit IC2 has prepared the capacitance data, the output port OT1 of the judging circuit IC2 sends the capacitance data to an input port SL of the detecting circuit IC1. Then, the judging circuit IC2 transmits a clock signal from an output port OT2 to an input port SCL of the detecting circuit IC1 to latch the prepared capacitance data. An input port END of the detecting circuit IC1 receives data representing whether the enabling signal sent from the output port INE of the detecting circuit IC1 is accepted or not by the judging circuit IC2. Thus, it can be checked whether, within the time duration of the enabling signal, the signal from the output port SOT which represents the amount of capacitance detected by the detecting circuit IC1 is processed by the judging circuit IC2. The resultant data processed by the judging circuit IC2 indicates whether the occupant existed or not. This processed data is inputted from the output port OT4 of the judging circuit IC2 to the input port INP of the detecting circuit IC1. In addition, the input port INS of the detecting circuit IC1 is set to receive a signal for switching the switch SW1 on or off depending on the timing of the acceptance of the capacitance data by the judging circuit IC2. The judging circuit IC2 is provided with a terminal ExRST for receiving an external reset signal from outside the ECU.

An input circuit SC is connected to an input port IN1 of the judging circuit IC2, the output side of the resistor R6 and the output side of the resistor R7. A power supply circuit PC is connected to a port $V_{cc}$ of each of the detecting circuit IC1 and the judging circuit IC2 for supplying a current thereto and is connected to a port RST of each of the detecting circuit IC1 and the judging circuit IC2 for feeding a reset signal thereto. The power supply circuit PC is connected to a power source B via the parallel connection of a diode D1, a diode D2 connected in series with an ignition switch IG, and a diode D3 connected in series with an accessory switch ACC. The ignition switch IG and the accessory switch ACC are connected via the diode D4 and the diode D5, respectively, to the input circuit SC. Oscillating elements OSC1 and 0SC2 are connected to the ports X1 and X0 of the detecting circuit IC1 and the judging circuit IC2. The detecting circuit IC1 and the judging circuit IC2 are grounded at their ground ports GND. An external system 16 such as display or screen is connected via an output OC to an output port OTP of the detecting circuit IC1.

The actual operation of the system is as follows. If a reference signal in the form of a pulse signal having a certain frequency is outputted from the output port SEO of the detecting circuit IC1 while the switch SW1 is in its OFF position, a signal which has a phase difference relative to the reference signal is generated by the resistor R1 and the input signal processor FL1. The resultant phase difference depends on the capacitance of the capacitor C1, the resistance of the resistor R1, the operation time of the inner circuit CMP1/CMP2, and other related factors.

If a reference signal is outputted from the output port SEO of the detecting circuit IC1 while the switch SW1 is in the ON position, a signal which has a phase difference relative to the reference signal is generated by the resistor R1 and the input signal processor FL1. However, the resultant phase difference depends on the capacitance of each of the capacitors CA, CB, CC, and C1. The effect of the capacitors CB and CC on the phase difference is negligible. The reason the effect of the capacitors CB and CC is negligible is that the operational amplifier OP1 eliminates any substantial voltage difference between node "a" and node "b". Consequently, there is no voltage difference across capacitor CC, and therefore the effect of the capacitor CC and CB on the phase difference is eliminated.

The generated signal having the forgoing phase difference is compared with the first threshold level VTH1 at the first comparator CMP1, and the output from the comparator CMP1 is regarded as a detecting signal in the form of a pulse signal. This detecting signal has a phase difference relative to the reference signal and is inputted to the input port SE1 of the detecting circuit IC1. Similarly, the reference signal having the forgoing phase difference is compared with the second threshold level VTH2 at the second comparator CMP2. Also, the output from the comparator CMP2 is regarded as another detecting signal. When the detecting signals are inputted to the input ports SE1 and SEII, the exclusive logical sum of the reference signal outputted from the port SEO and the detecting signal inputted to the input port SE1 is calculated in order to obtain a signal that represents the phase difference. Also, the exclusive logical sum of the reference signal outputted from the port SEO and the detecting signal inputted to the port SEII is calculated. The resultant exclusive logical sums are converted into capacitance data. The average value of both of the capacitance data are transmitted to the input port IN3 of the judging circuit IC2 from the output port SOT of the detecting circuit IC1.

Figure 6:
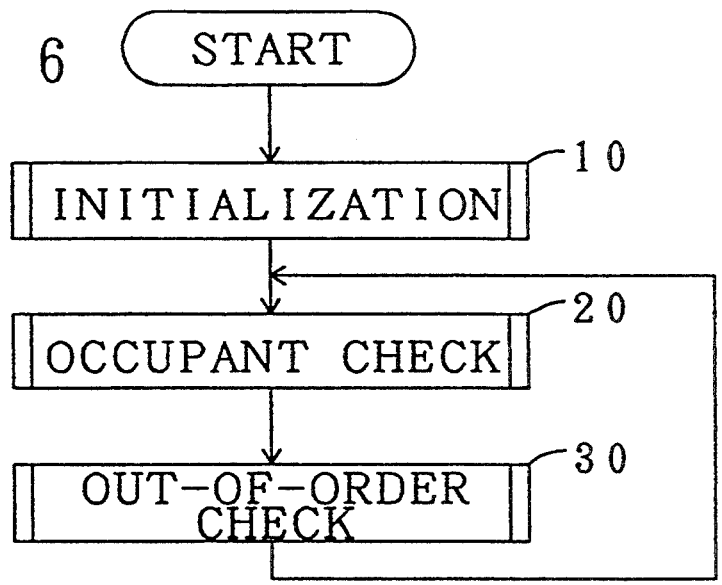
FIG. 6 is a flow-chart showing the main routine of an overall operation of a dielectric detecting device according to the present invention.

FIG. 6 shows an overall operation of the judging circuit IC2 in the form of a flow chart. As can be seen from FIG. 6, the memory EP1 of the judging circuit IC2 is initialized at step 10, a decision whether the occupant exists or not is established at step 20, and step 30 checks for a malfunction or an error.

Figure 7:
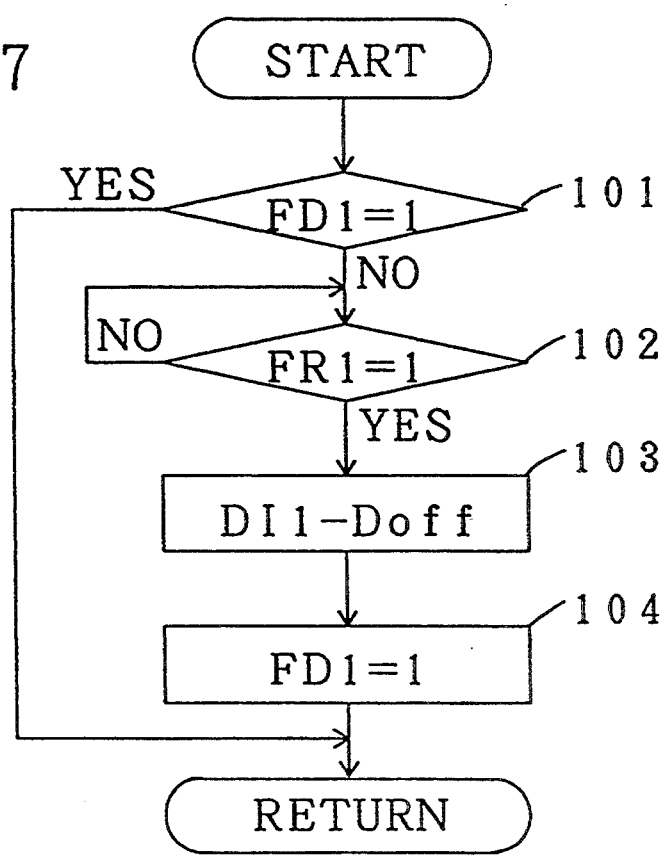
FIG. 7 is a flow-chart showing an initialization process as a subroutine.

The detailed initialization procedure is illustrated in FIG. 7. In FIG. 7, at step 101, a flag FD1 is checked to determine whether it is "1" or not. The flag FD1 is set to "1" when data which represents the initial capacitance data is stored in the memory EP1 of the judging circuit IC2. If the flag FD1 is "1", the initial capacitance data has been already stored in the memory EP1, and the system has already been initialized. Thus, the initialization procedure is complete. If the flag FD1 is "0", the initial capacitance data has not been stored in the memory EP1, and step 102 is executed. At step 102, a flag FR1 is checked to determine whether it is "1" or not. The flag FR1 is set to "1" when the reset signal is transmitted from the terminal ExRST to the judging circuit IC2. The reset signal is applied before the installation of the device. Unless the flag FR1 is "1", step 102 is executed again. If the flag FR1 is "1", the next step 103 is executed. It should be noted that instead of the flag FD1, a CRC code may be used. During the execution of step 103, the capacitance data Doff is determined. The capacitance data Doff represents the average capacitance value detected by the detecting circuit IC1 at the input ports SE1 and SEII when the switch SW1 is in the OFF position. To determine the capacitance data Doff, the detecting circuit IC1 outputs a signal from the output port SWC to place the switch SW1 in the OFF position. The resultant capacitance values at the input ports SE1 and SEII of the detecting circuit IC1 are inputted to the detecting circuit IC1. The detecting circuit IC1 averages the capacitance values at the input ports SE1 and SEII and outputs the capacitance data Doff from its output port SOT to the input port IN3 of the judging circuit IC2. The judging circuit IC2 stores this data in the memory EP1 as the capacitance data Doff. Subsequently, the capacitance data Doff which is stored in the memory EP1 is considered the initial capacitance data DI1. Then, at step 104, the flag FD1 is set to "1", and the memory EP1 of the judging circuit IC2 is initialized.

Figure 8:
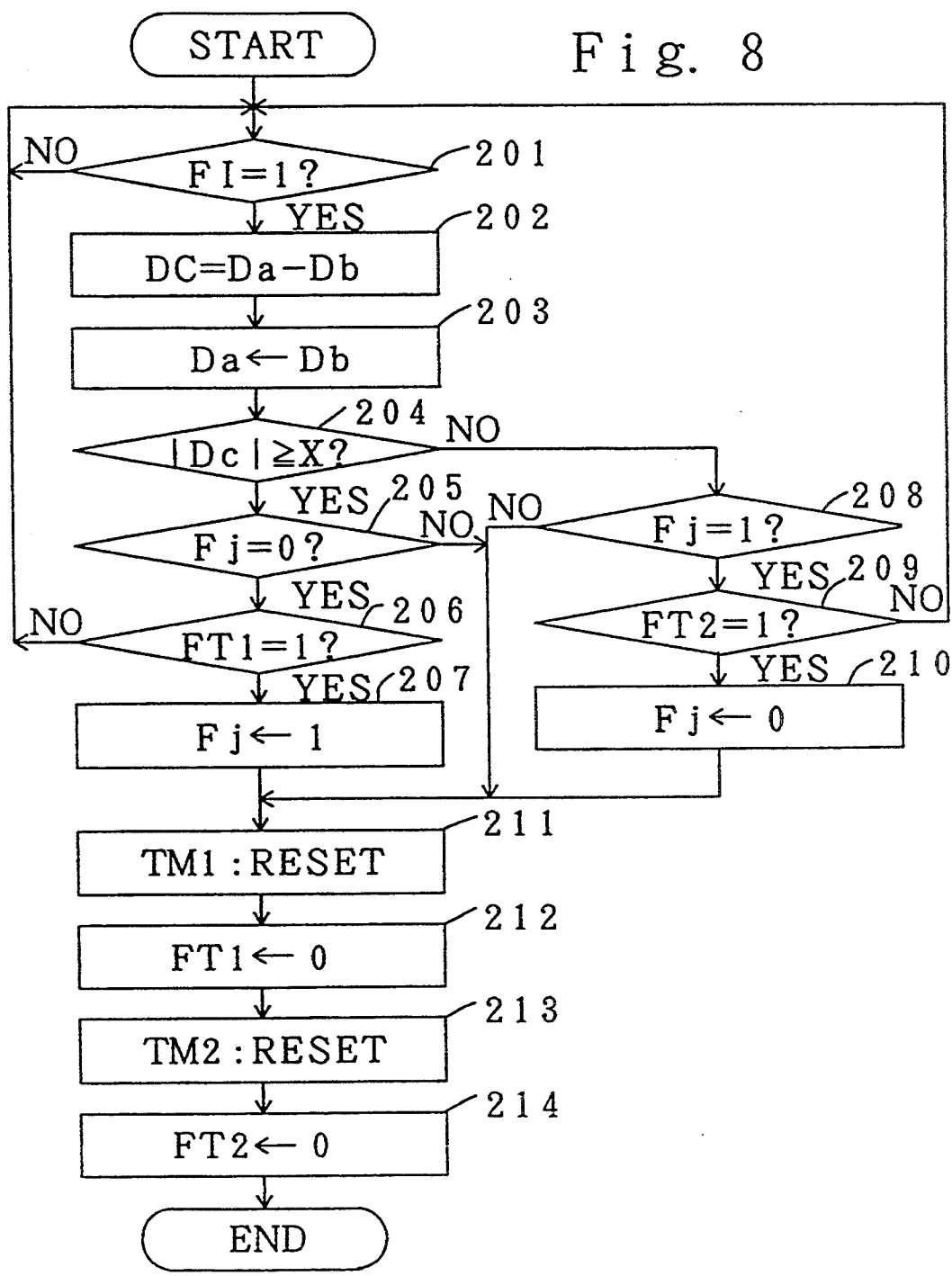
FIG. 8 is a flow-chart showing a judging of an existence of an occupant process as a subroutine.

FIG. 8 consists of a flow chart describing how the existence of the occupant is determined. In FIG. 8, at step 201, a flag F1 in the judging circuit IC2 is checked every 5 times to determine whether it is "1" or not. The flag F1 is set to "1" each time capacitance data is inputted to the input port IN3 of the judging circuit IC2 from the output port SOT of the detecting circuit IC1. If the flag F1 is found to be "1" (i.e. capacitance data has just been inputted to the judging circuit IC2), steps 202 through 204 are executed. During step 202, the current capacitance data Db that was just inputted is compared to the previous capacitance data Da in order to obtain the difference Dc therebetween. The previous capacitance data Da is the capacitance data that was inputted to the judging circuit IC2 the time before the current capacitance data Db was inputted to the judging circuit IC2. Furthermore, both the previous capacitance data Da and the current capacitance data Db correspond to capacitance values inputted to the input port SE1 of the detecting circuit IC1 when the switch SW1 was in the ON position. The difference Dc between the current capacitance data Db and the previous capacitance data Da is stored in a specific data register (not shown). At step 203, the current capacitance data Db is stored as the new previous capacitance data Da in the previous data register (not shown). At step 204, the absolute value of the difference Dc is compared to a specific constant value X. If the difference Dc is not less than the constant value X, step 205 is executed. Step 205 determines whether a flag FJ is "1" or not. When the flag FJ is "1" a status of "Occupant existing" is established. When the flag FJ is "0", a status of "No occupant" is established. If the flag FJ is found to be "0" at step 205, step 206 is executed. Step 206 determines whether a flag FT1 is "1" or not. The flag FT1 is set to "1" when a timer TM1 exceeds a determined time. The timer TM1 begins timing when the status of "Occupant existing" changes to "No occupant" At step 206, if the flag FT1 is "1", the control proceeds to step 207. At step 207, the flag FJ is set to "1" to indicate an "Occupant existing" status.

On the other hand, at step 204, if the difference Dc is less than the constant value X, step 208 is executed. Step 208 determines whether the flag FJ is "1" or not. If the flag FJ is "1", step 209 is executed. At step 209, the flag FT2 is checked whether it is "1" or not. Flag FT2 is set to "1" when a timer TM2 exceeds a determined time. The timer TM2 begins timing when the status of "No occupant" changes to "Occupant existing." If the flag FT2 is found to be "1", then the "Occupant existing" status has been changed to "No occupant" status for longer than the predetermined time, and step 210 is executed. At step 210, the flag FJ is reset to "0" to indicate a "No occupant" status. If flag FT2 is "0", then step 201 is executed again, and the system awaits for capacitance data to be inputted to port IN3 of the judging circuit IC2 (i.e. the system awaits for flag F1 to be "1").

If the flag FJ equals "1" at step 205 or if the flag FJ equals "0" at step 208, steps 211 through 214 are executed. Similarly, steps 211 through 214 are executed after step 207 or step 210 is executed. At step 211, the timer TM1 is reset. At step 212, the flag FT1 is set to "0". At step 213, the timer TM2 is reset. Finally, at step 214, the flag FT2 is set to "0".

It is to be noted that the judging circuit IC2 is brought into its waiting condition or operating condition depending on the enabling signal which is outputted from the output port INE of the detecting circuit IC1. The enabling signal is inputted to the input ports IN2 and CE of the judging circuit IC2. The enabling signal enables the transfer of capacitance data from the output port SOT of the detecting circuit IC1 to the input port IN3 of the judging circuit IC2. In addition, the enabling signal enables the transfer of data from the ignition switch IG and the accessory switch ACC to the input port IN1 of the judging circuit IC2.

Figure 9:
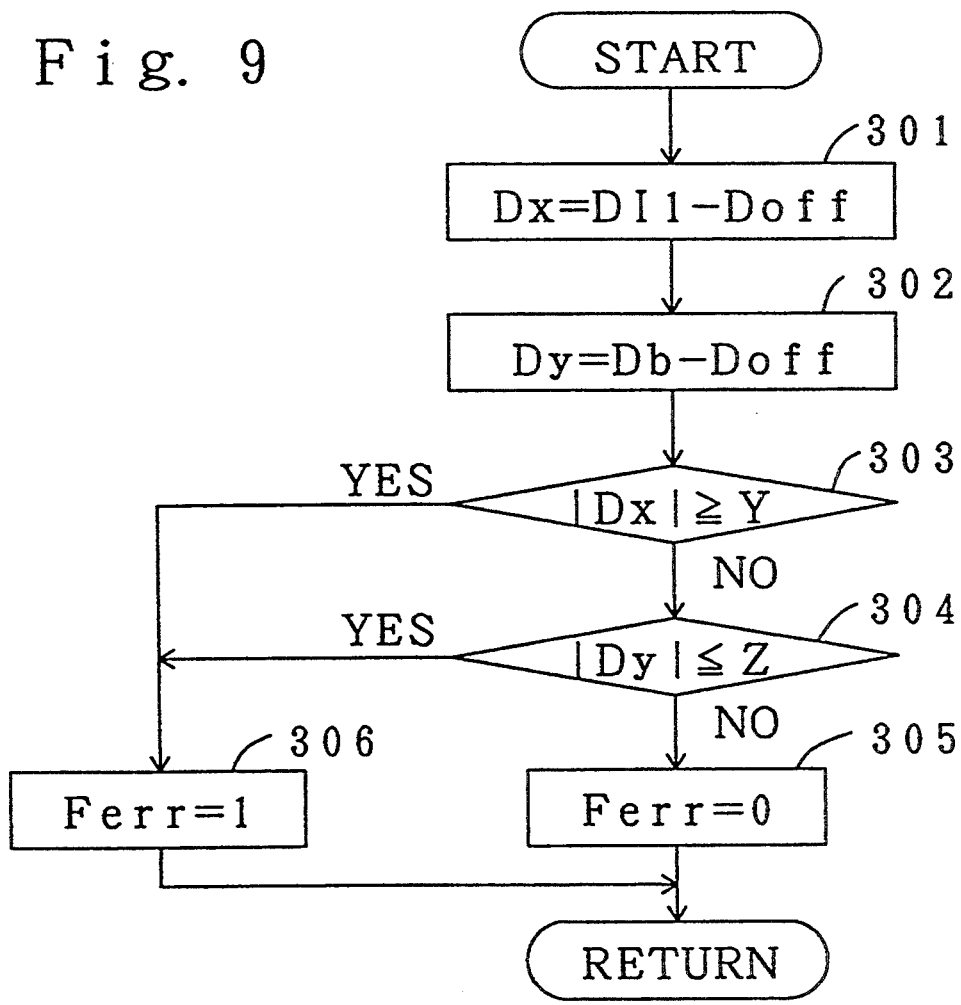
FIG. 9 is a flow-chart showing an error detecting process as a subroutine.

FIG. 9 shows a trouble or an error detection process which is the gist of the present invention. In FIG. 9, at step 301, the current capacitance value Doff is recalculated by turning the switch SW1 off and averaging the capacitance values input to the input ports SE1 and SEII of the detecting circuit IC1 as described above. Then, the difference Dx between the capacitance data Doff and the initial capacitance data DI1 is calculated. In step 302, the difference Dy between the current capacitance data Db and the capacitance data Doff is calculated. Practically speaking, Dy is defined by the difference between the capacitance of the capacitor C1 and the capacitance of the in-series capacitors C1 and CA.

At step 303, the absolute value Dx is compared to a first reference value Y. The first reference value Y is used to judge whether a severe change in the circuit characteristics has occurred. The first reference value Y is determined according to the thermal characteristics of the circuit and the change in the characteristics with the passage of time. If the absolute value of Dx is greater than the first reference value Y, a severe change is deemed to have occurred, and step 306 is executed. At step 306, an error flag Ferr is set to "1". If the absolute value of Dx is found to be less than the first reference value Y, the control proceeds to step 304.

At step 304, the absolute value of Dy is compared to a second reference value Z. The second reference value Z represents the capacitance value of the capacitor CA when CA is operating properly. If the absolute value of Dy is not greater than the second reference value Z, it is assumed that there is an error or a malfunction in the resistor R13, the capacitor CA, the switch SW1, or other failures in the system. Subsequently, step 306 is executed. At step 306, the error flag Ferr is set to "1".

On the other hand, if the absolute value of Dy is found to be greater than the second reference value Z at step 304, step 305 is executed. At step 305, the error flag Ferr is set to "0" which indicates that no errors or troubles are detected.

The foregoing Dx is used for correcting the thermal characteristics in the circuit, which enables the employment of low cost elements.

As mentioned above, between the input signal processor FL1 and the sensor electrode 11, the switch SW1 is interposed for establishing and interrupting the electrical connection therebetween. The foregoing trouble detection procedure assures the prevention of a "No occupant" status even if electrical current to the input signal processor FL1 is interrupted during a status of "Occupant existing." In addition, various errors can be detected, such as the removal of the input signal processor FL1, a malfunction of the sensor electrode 11, a malfunction of the earth electrode 12, or a malfunction of the intermediate electrode 13. It is to be noted that the equalizing circuit IC3 can be incorporated in the sensor 14 instead of the occupant detecting device ECU.

The invention has thus been shown and described with reference to a specific embodiment, however, it should be noted that the invention is in no way limited to the details of the illustrated structures but changes and modifications may be made without departing from the scope of the appended claims.

What is claimed is:

1. A dielectric detecting device comprising:
   an earth electrode;
   sensor electrode opposed to the earth electrode for constituting a capacitor whose capacitance varies with the existence of a dielectric object therebetween;
   a detecting means for detecting detected capacitance values, wherein the detecting means is capable of independently detecting a change in the capacitance of the capacitor and other detected capacitance values of a circuit;
   an input signal processing means disposed between the detecting means and the sensor electrode;
   a switching means for selectively connecting the input signal processing means and the sensor electrode; and
   a judging means for making a first judgment and a second judgment, wherein the first judgment determine whether the dielectric object exists between the sensor electrode and the earth electrode or not and wherein the second judgment determines whether or not a malfunction has occurred on the basis of the detected capacitance values detected by the detecting means.

2. A dielectric detecting device in accordance with claim 1, wherein the dielectric object is an occupant.

3. A dielectric detecting device according to claim 1 wherein the second judgment determines that the malfunction has occurred by evaluating the detected capacitance values detected by the detecting means when the switching means is in an OFF position and by evaluating the detected capacitance values detected by the detecting means when the switching means is in an ON position.

4. A dielectric detecting device according to claim 3 the malfunction occurs if the earth electrode, the sensor electrode, the detecting means, or the input signal processing means malfunctions.

5. A dielectric detecting device according to claim 4, wherein the dielectric object is an occupant.

6. A dielectric detecting device according to claim 3, wherein the second judgment determines that the malfunction occurs if an absolute value of an difference between a first detected capacitance value and an initial detected capacitance value is greater than a first reference value or if an absolute value of difference between the first detected capacitance value and a second detected capacitance value is less than a second reference value, wherein the first detected capacitance value is one of the detected capacitance values detected by the detecting means when the switching means is in the OFF position and the second detected capacitance value is one of the detected capacitance values detected by the detecting means when the switching means is in the ON position.

7. A dielectric detecting device according to claim 6, wherein the dielectric object is an occupant.

8. A dielectric detecting device according to claim 3, wherein the dielectric object is an occupant.

* * * * *